United States Patent [19]

Lew et al.

[11] Patent Number: 5,456,121
[45] Date of Patent: Oct. 10, 1995

[54] PIVOTABLE VANE FLOWMETER WITH CAPACITIVE POSITION SENSOR

[76] Inventors: Hyok S. Lew; Yon S. Lew; Yon K. Lew, all of 7890 Oak St., Arvada, Colo. 80005

[21] Appl. No.: 137,560

[22] Filed: Oct. 18, 1993

[51] Int. Cl.⁶ .................................................. G01F 1/28
[52] U.S. Cl. ............................ 73/861.72; 73/861.75
[58] Field of Search .......................... 73/861.35, 861.72, 73/861.75, 861.76, 861.74

[56] References Cited

U.S. PATENT DOCUMENTS

| | | | |
|---|---|---|---|
| 1,510,689 | 10/1924 | Manifold | 73/861.72 |
| 2,483,190 | 9/1949 | Evans | 73/861.72 |
| 4,250,745 | 2/1981 | Blatter et al. | 73/861.74 |
| 4,291,584 | 9/1981 | Anderson | 73/861.72 |
| 4,393,723 | 7/1983 | Brand | 73/861.72 |
| 4,777,830 | 10/1988 | Lew | 73/861.75 |
| 4,911,022 | 3/1990 | Lew | 73/861.75 |

Primary Examiner—Richard E. Chilcot, Jr.
Assistant Examiner—William L. Oen

[57] ABSTRACT

A pivotable vane flowmeter comprises at least one pivotable vane disposed pivotably about a pivot axis parallel to the direction of fluid flow and experiencing a fluid dynamic torque created by the fluid flow, a bias spring or counter-weight providing a bias torque counter-acting the fluid dynamic torque, and a rotary position sensor detecting the rotary position of the pivotable vane about the pivot axis, wherein the dynamic pressure of the fluid flow is determined as a function of the rotary position of the pivotable vane about the pivot axis, and the time rate of the fluid flow is determined from a combination of the dynamic pressure of the fluid flow and the known or measured value of the fluid density, or from another combination of the dynamic pressure of the fluid flow and the frequency of rotation of a rotating turbine or propeller installed in conjunction with the pivotable vane flowmeter.

17 Claims, 4 Drawing Sheets

PIVOTABLE VANE FLOWMETER WITH CAPACITIVE POSITION SENSOR

FIELD OF THE INVENTION

This invention relates to a flowmeter comprising at least one rotating turbine and pivotable vane with capacitive transducers remotely and automatically providing electronic data on the rotary speed of the rotating turbine and the rotary position of the pivotable vane, wherein the volume flow rate of media moving through the rotating turbine is determined as a function of the rotary speed of the rotating turbine and the dynamic pressure of the media flow is determined as a function of the rotary position of the pivotable vane, and the mass flow rate of the media is determined as a function of the rotary speed of the rotating turbine and the rotary position of the pivotable vane.

1. Background of Invention

With few exceptions, the conventional turbine, paddle, propeller or screw flowmeters employ a magnetic induction or magnetic reluctance transducer in measuring the rotary speed of the rotary members rotated by the fluid dynamic torque exerted thereon by the media flow, which types of transducers are less than desirable because these conventional transducers require a permanent magnet that limits the high temperature applications of the flowmeters beyond the Curie temperature, provide a very weak electrical signal at low velocities of the media, inhibit the start of the rotation of the rotary member under the fluid dynamic torque due to the magnetic force exerted on the rotary member by the permanent magnet included in the transducer, and the transducer cannot be packaged into a thin streamlined structure such as a shroud, tip of blade or hub of the rotary member rotated by the fluid dynamic torque due to the bulk and mass of the permanent magnet or a ferromagnetic element required to construct the transducer. A pivotable but nonrotating vane can be disposed pivotally about an axis of pivot and provided with a bias torque countering the fluid dynamic torque exerted on the vane by the media flow, wherein the dynamic pressure of the media flow is determined as a function of the rotary position of the vane. At the present time, the vane flowmeter measuring the rotary position of the vane and determining the dynamic pressure of the media flow as a function of the rotary position of the pivotable vane has not been put into the practice.

2. Brief Summary of Invention

The primary object of the present invention is to provide a rotating turbine, paddle, propeller or screw flowmeter, that employs a capacitive rotary speed sensor providing an alternating electrical signal with a frequency directly proportional to the rate of rotation of the rotary member rotated by the fluid dynamic torque exerted by the media flow.

Another object is to provide the capacitive rotary speed sensor described in the afore-mentioned primary object of the present invention, that comprises a pair of stationary electrically conductive members with a sizable surface area disposed on a surface adjacent to a surface defined by a rotating electrically conductive member with a sizable surface area affixed to the rotary member, wherein the sizable surface areas of the pair of stationary electrically conductive members and the sizable surface area of the rotating electrically conductive member intermittently establish a close surface-to-surface proximity relationship therebetween during the rotation of the rotary member. A first alternating electrical signal is supplied to the first of the pair of stationary electrically conductive members and a second alternating electrical signal is taken off from the second of the pair of stationary electrically conductive members, and the rate of rotation of the rotary member is determined as a function of the frequency of fluctuation of the envelope of the second alternating electrical signal.

A further object is to provide a pivotable but nonrotating vane flowmeter comprising a pivotble vane disposed pivotally about an axis of pivot and provided with a bias torque countering the fluid dynamic torque exerted on the pivotable vane by the media flow, wherein a capacitive rotary position sensor measures the rotary position of the pivotable vane and a data processor determines the dynamic pressure, which is equal to one half of the media density times the square of the media velocity, as a function of the rotary position of the pivotable vane.

Yet another object is to provide the capacitive rotary position sensor described in the afore-mentioned a further object of the present invention, that comprises a pair of stationary electrically conductive elongated members with a sizable surface area disposed in a side-by-side parallel relationship circumferentially on a circular cylindrical surface coaxial and closely adjacent to another circular cylindrical surface defined by a sizable surface area of a pivoting electrically conductive stub member affixed to a radial extremity of the pivotable vane, wherein the sizable surface area of the pivoting electrically conductive stub member and the sizable surface areas of the pair of stationary electrically conductive elongated members maintain a close surface-to-surface proximity relationship therebetween at all phases of pivoting movement of the pivotable vane. An alternating electrical signal is supplied to one or both of the two opposite extremities of the first of the pair of stationary electrically conductive elongated members, and a phase angle difference between two alternating electrical signals respectively taken off from the two opposite extremities of the second of the pair of stationary electrically conductive elongated members is measured and the rotary position of the pivotable vane is determined as a function of the measured phase angle difference.

Yet a further object is to provide the capacitive rotary position sensor described in the afore-mentioned a further object of the present invention, that comprises a single stationary electrically conductive elongated member with a sizable surface area disposed circumferentially on a circular cylindrical surface coaxial and closely adjacent to another circular cylindrical surface defined by a sizable surface area of a pivoting electrically conductive stub member affixed to a radial extremity of the turbine or propeller, wherein the sizable surface area of the pivoting electrically conductive stub member and the sizable surface areas of the single stationary electrically conductive elongated member maintain a close surface-to-surface proximity relationship therebetween at all phases of pivoting movement of the pivotable vane. An alternating electrical signal is supplied to one of the three elements comprising the pivoting electrically conductive stub member and the two opposite extremities of the single stationary electrically conductive elongated member and a phase angle difference between two alternating electrical signals respectively taken off from two of the three elements comprising the pivoting electrically conductive stub member and the two opposite extremities of the single stationary electrically conductive elongated member is measured, and the rotary position of the pivotable vane is determined as a function of the measured phase angle difference.

Still another object is to provide a multi-function or compound flowmeter comprising a series combination of a rotating turbine or propeller flowmeter and a pivotable but nonrotating vane flowmeter, wherein the volume flow rate of the media is determined as a function of the rotary speed of the rotating turbine or propeller, and the mass flow rate of the media is determined as a function of the rotary speed of the rotating turbine or propeller and the rotary position of the pivotable vane. The density of the media is determined as a ratio of the mass flow rate to the volume flow rate of the media.

These and other objects of the invention will become clear as the description of the invention progresses.

BRIEF DESCRIPTION OF THE FIGURES

The present invention may be described with a greater clarity and specificity by referring to the following figures.

DESCRIPTION OF ILLUSTRATED EMBODIMENTS

Figure 1:
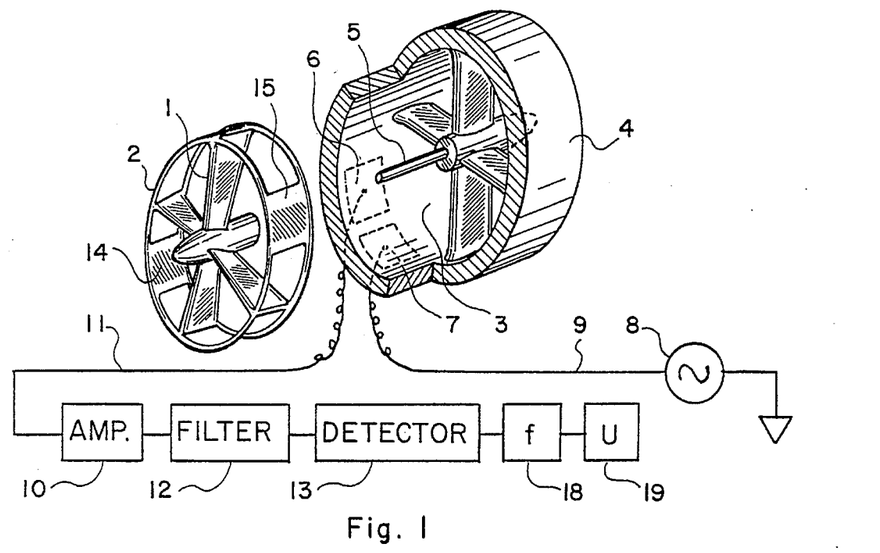
FIG. 1 illustrates an exploded view of an embodiment of the rotating turbine or propeller flowmeter employing a capacitive rotary speed sensor of the present invention.

In FIG. 1 there is illustrated an exploded view of an embodiment of the rotating turbine or propeller flowmeter employing an embodiment of the capacitive rotary speed sensor of the present invention. A turbine or propeller 1 having a shroud 2 of a circular cylindrical shell geometry is disposed rotatably in a flow passage 3 provided by a conduit 4, wherein the turbine or propeller 1 is supported by a shaft 5 in a freely rotatable arrangement. This combination of the turbine or propeller 1 and the conduit 4 works best if the flow passage 3 has a circular cross section and the turbine or propeller 1 is coaxially disposed in the flow passage 3 in such a way that the gap between the shroud 2 or the radial edge of the turbine or propeller 1 and the wall of the flow passage 3 is small. A pair of stationary electrically conductive members having a sizable surface area, each of which is constructed in the form of a metallic patch or plate, are embedded in or bonded to a stationary member such as the wall of the flow passage 4, wherein the pair of patches or plates 6 and 7 are disposed in an electrically nonconducting relationship therebetween at a close proximity to one another on a common circular cylindrical surface approximately coaxial and substantially close to the inner circular cylindrical surface of the conduit wall. An alternating electrical signal generator 8 supplies an alternating electrical signal oscillating at a frequency of the order of kilo-Hertz or higher to one of the pair of patches or plates 6 and 7 through a lead wire 9 connected to that patch or plate. The other of the pair of patches or plates 6 and 7 is connected to an amplifier 10 by a lead wire 11. The alternating electrical signal amplified by the amplifier 10 is conditioned by an electronic filter 12. A detector 13 eliminates the alternating electrical signal playing the role of a carrier signal and transmits therethrough only the envelope of the alternating electrical signal, wherein the dc component included in the envelope signal is eliminated by the detector 13. The shroud 2 of the turbine or propeller 1 comprises cut-outs and thin structural elements having a negligibly small value of the electric capacitance, and two electrically conductive thin members 14 and 15 having a sizable surface area and a sizable value of the electric capacitance, which thin members 14 and 15 are disposed on a circular cylindrical surface approximately coaxial and substantially close to the inner circular cylindrical surface of the conduit wall in a diametrically opposite relationship therebetween. This particular illustrative embodiment of the construction of the shrouded turbine or propeller 1 is for an all metal construction, wherein each revolution of the turbine or propeller 1 generates two peaks in the envelope of the alternating electrical signal. In alternative designs, the turbine or propeller may have a shroud of solid circular cylindrical shell geometry without any cut-outs made of a dielectric material such as a plastic or ceramic matter and one or more metallic patches or plates may be embedded in or bonded to the shroud, or the turbine or propeller may have one or more thin metallic plates disposed tangentially to the inner circular cylindrical wall of the conduit wall and respectively affixed to the tips of the individual blades of the turbine or propeller as exemplified by the turbines or propellers included in the embodiment shown in FIG. 15. It should be understood that the conduit wall 4 or at least a portion thereof adjacent to the pair of patches or plates 6 and 7 must be made of an electrically nonconducting dielectric material such as a plastic or ceramic matter. During the rotation of the turbine or propeller 1, the sizable surface area of each of the electrically conductive thin members 14 and 15 rotating with the turbine or propeller 1 comes to a close surface-to-surface proximity relationship with the pair of stationary electrically conductive patches or plates 6 and 7 once for every revolution of the turbine or propeller 1. When the electrically conductive thin member 14 or 15 rotating with the turbine or propeller 1 is at a close proximity to the pair of stationary electrically conductive patches or plates 6 and 7, the alternating electrical signal supplied to one of the pair of stationary patches or plates becomes vigorously transmitted to the other of the pair of stationary patches or plates 6 and 7 as a result of the capacitive electrical interaction between the sizable surface area of the electrically conductive thin member 14 or 15 and the sizable surface areas of the pair of stationary patches or plates 6 and 7, and consequently, the envelope of the alternating electrical signal supplied to the amplifier 10 reaches a peak. When neither of the two electrically conductive thin members 14 and 15 rotating with the turbine or propeller 1 is at a close proximity to the pair of stationary patches or plates 6 and 7, the electric circuit between the signal generator 8 and the amplifier 10 lacks the capacitive connection therebetween, and consequently, the envelope of the alternating electrical signal supplied to the amplifier 10 reaches a valley. As a consequence, the envelope of the alternating electrical signal minus the dc component entrained therein, that is provided by the detector 13 oscillates or fluctuates with a frequency equal to the rate of rotation of the turbine or propeller 1 times the number of electrically conductive thin members such as the elements 14 and 15 included in the turbine or propeller 1.

Figure 2:
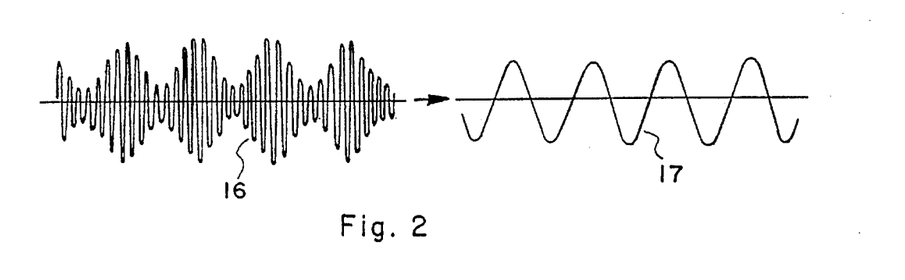
FIG. 2 illustrates an alternating electrical signal provided by the capacitive rotary speed sensor and the envelope of the alternating electrical signal.

In FIG. 2 there is illustrated the alternating electrical signal 16 transmitted from the signal generator 8 to the amplifier 10, which has a fluctuating envelope with a frequency equal or proportional to the rate of rotation of the turbine or propeller 1, and the output signal 17 provided by the detector 13, that is the envelope of the alternating electrical signal 16 minus the dc component entrained therein. The frequency of the output alternating electrical signal 17 is equal to the revolutions per unit time of the turbine or propeller times the number of electrically conductive thin members such as the elements 14 and 15 included in the turbine or propeller.

It is well known fact that the fluid dynamic torque $T_U$ received by a rotary 32. member such as the turbine, paddle, propeller, or screw immersed in a stream of the fluid media moving at a velocity U, is proportional to the dynamic pressure of the fluid media, that is equal to one half of the media density $\rho$ times the square of the media velocity U, $$T_U = \frac{C_L}{2} \rho U^2, \quad (1)$$

where $C_L$ is the lift coefficient of the blades of the rotary member. The drag torque $T_D$ experienced by the rotary member rotating at a rotary speed $\Omega$ is given by equation $$T_D = \frac{C_D}{2} \rho \Omega^2, \quad (2)$$

where $C_D$ is the drag coefficient of the blades of the rotary member. At the steady state rotation of the rotary member, the fluid dynamic torque given by equation (1) and the drag torque given by equation (2) are under equilibrium, which condition provides the following equation:

$$U = C\Omega \quad (3)$$

where C is a constant of proportionality defined by equation $$C = \sqrt{C_D/C_L}. \quad (4)$$

Since the rotary speed $\Omega$ is proportional to the frequency f of the output alternating electrical signal provided by the detector 13, equation (3) can be written in the form $$U = \frac{f}{K}, \quad (5)$$

where K is a constant of proportionality to be determined empirically by calibrating the flowmeter, which constant of proportionality is related to the lift and drag coefficients and the number N of the electrically conductive thin members or patches included in the rotary member $$K = \frac{N}{2\pi} \sqrt{\frac{C_L}{C_D}}. \quad (6)$$

The frequency detector 18 included in the embodiment shown in FIG. 1 measures the frequency f of the output alternating electrical signal put out by the detector 13, and the data processor 19 determines the velocity U or the volume flow rate of the media as a function of the measured frequency f by using an empirically obtained mathematical relationship therebetween.

It should be mentioned that the capacitive rotary speed sensor of the present invention shown and described in conjunction with FIGS. 1 and 2 provides a number of advantages over the conventional rotary speed sensor operating on the principles of the magnetic induction or the magnetic reluctance. Firstly, the capacitive rotary speed sensor can be assembled or packaged into a thin streamlined structure as evidenced by the construction thereof shown in FIG. 1, while the conventional speed sensor employing a permanent magnet requires a more bulky packaging. Secondly, the capacitive rotary speed sensor does not exert any force on the rotary member, and consequently, the rotary member starts rotating under a very low fluid dynamic torque, while the permanent magnet included in the conventional rotary speed sensor exerting a magnetic attractive force on one or more blades of the rotary member prevents the rotary member from starting to rotate until the magnitude of the fluid dynamic torque exceeds the magnetic grabbing force exerted by the permanent magnet included in the conventional rotary speed sensor. Thirdly, the capacitive rotary speed sensor gets rid of the limit set by the Curie temperature of the permanent magnet included in the conventional rotary speed sensor in the high temperature applications of the flowmeter, and consequently, a turbine or propeller flowmeter employing the capacitive rotary speed sensor of the present invention made of ceramic and high temperature metallic materials is compatible with many high temperature applications beyond the limit of the conventional turbine or propeller flowmeters. It should be understood that the application of the capacitive rotary speed sensor of the present invention shown and described in conjunction with the turbine or propeller flowmeter shown in FIG. 1 is not limited to the flowmeters employing a turbine, paddle, propeller, screw, or other rotary member receiving a fluid dynamic torque from the flowing fluid media, as the capacitive rotary speed sensor of the present invention can be used to measure the time rate of rotation of any rotating members or elements included in the mechanical, fluid handling and fluid measuring apparatus. The electrically conductive thin member included in the shroud 2 of the turbine or propeller 1 may be constructed in the form of a patch or curved plate embedded in or bonded to the shroud, wherein the patch or curved plate may extend circumferentially over a minor, a half, or a major portion of the circumference of the shroud. The frequency of the alternating electrical signal playing the role of the carrier signal may be selected to create a resonance condition providing the maximum transmission of the carrier alternating electrical signal by the capacitive electrical connection between the signal generator 8 and the amplifier 10. In order to minimize the noise, the turbine or propeller flowmeter employing the capacitive rotary speed sensor may be surrounded by a metallic enclosure encasing the dielectric wall of the conduit 4, which metallic enclosure provides an electromagnetic shielding. When the dielectric wall of the conduit 4 is encased within a metallic cylindrical shell, the dielectric wall of the conduit 4 must have a sufficient thickness providing a sizable spacing between the pair of stationary electrically conductive members 6 and 7, and the wall of the metallic cylindrical shell.

Figure 3:
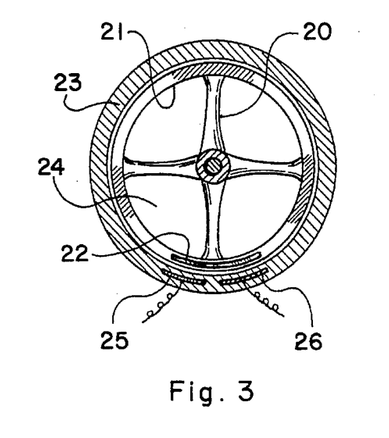
FIG. 3 illustrates another embodiment of the rotating turbine or propeller flowmeter employing the capacitive rotary speed sensor.

In FIG. 3 there is illustrated another embodiment of the turbine or propeller flowmeter employing the capacitive rotary speed sensor. The turbine or propeller 20 has a shroud 21 of a solid circular cylindrical shell geometry made of a dielectric matter such as a plastic or ceramic material. A single electrically conductive thin member constructed in the form of a patch or curved plate 22 is embedded in or bonded to the shroud 21. A dielectric wall 23 of the flow passage 24 includes a pair of stationary electrically conductive members constructed in the form of patches or curved plates 25 and 26, which are respectively connected to a signal generator and an amplifier as shown in FIG. 1. The dielectric wall 23 of the flow passage 24 may be encased in a metallic cylindrical shell to provide an added structural strength of the wall 40 of the flow passage and the electromagnetic shielding, which encasing by the metallic cylindrical shell is not detrimental to the operation of the capacitive rotary speed sensor as long as the dielectric wall 23 has a sizable thickness that provides a sufficient spacing between the pair of stationary patches or plates 25 and 26, and the metallic cylindrical shell encasing the dielectric wall 23. The entire assembly of the turbine or propeller 20 and the shroud 21 may be made of a plastic material, or only the shroud 21 may be made of a plastic material, while the hub and blades of the turbine or propeller 20 are made of a metal. The electrically conductive patch or plate 22 may extend over a minor, a half, or a major portion of the circumference of the shroud 21.

Figure 4:
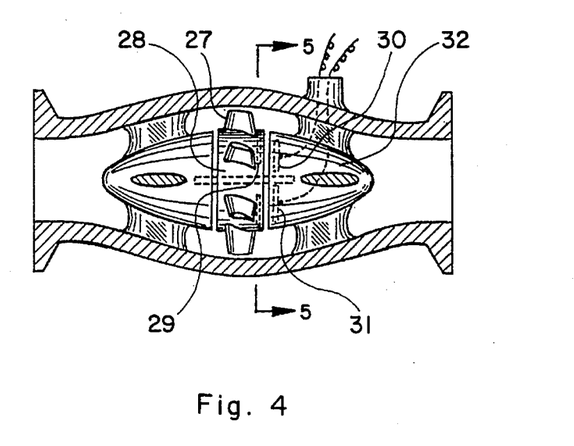
FIG. 4 illustrates a cross section of a further embodiment of the turbine or propeller flowmeter employing the capacitive rotary speed sensor.

In FIG. 4 there is illustrated a cross section of a further embodiment of the turbine or propeller flowmeter employing the capacitive rotary speed sensor, which embodiment is particularly suited for constructing a highly sensitive flowmeter or one with small port sizes. The turbine 27 has a large circular cylindrical hub 28 occupying a major portion of an enlarged cross section of the flow passage. An electrically conductive patch or plate 29 is embedded in or bonded on one of the two opposite end faces of the hub 28, while a pair of stationary electrically conductive patches or plates 30 and 31 respectively connected to a signal generator and an amplifier as shown in FIG. 1, are embedded in or bonded on one end face of the streamlined central core 32 rotatably supporting the hub 28 of the turbine 27, wherein the aforementioned end faces of the hub 28 and the central core 32 are facing one another in a close surface-to-surface proximity relationship.

Figure 5:
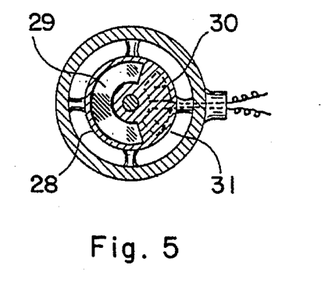
FIG. 5 illustrates another cross section of the turbine or propeller flowmeter shown in FIG. 4.

In FIG. 5 there is illustrated another cross section of the turbine flowmeter shown in FIG. 4, which cross section taken along plane 5—5 as shown in FIG. 4 illustrates with a greater clarity the disposition of the electrically conductive patch or plate 29 affixed to the hub 28 of the turbine 27, and the pair of stationary electrically conductive patches or plates 30 and 31 affixed to the central core 32, which pair of patches or plates 30 and 31 are respectively connected to a signal generator and an amplifier as shown in FIG. 1.

Figure 6:
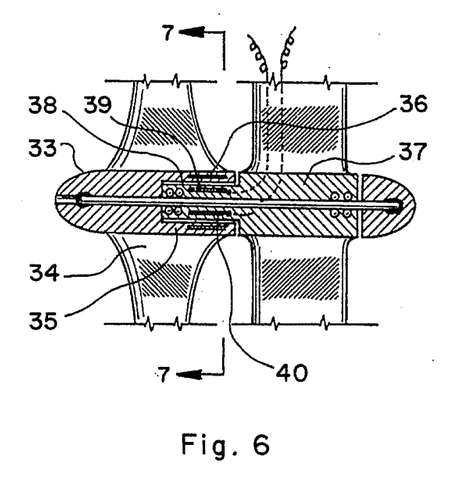
FIG. 6 illustrates yet another embodiment of the turbine or propeller flowmeter employing the capacitive rotary speed sensor.

In FIG. 6 there is illustrated yet another embodiment of the turbine or propeller flowmeter employing the capacitive rotary speed sensor. The hub 33 of the turbine or propeller 34 has a hollow cylindrical portion 35 that includes an electrically conductive thin member or patch 36 disposed on a circular cylindrical surface coaxial to the axis of rotation of the turbine or propeller 34. The streamlined stationary supporting member 37 rotatably supporting the turbine or propeller 34 has a circular cylindrical extension 38 extending into the hollow cylindrical portion 35 of the hub 33, which circular cylindrical extension 38 includes a pair of stationary electrically conductive members or patches 39 and 40 disposed on a circular cylindrical surface coaxial and closely adjacent to the circular cylindrical surface including the electrically conductive thin member or patch 36. The pair of stationary electrically conductive members or patches 39 and 40 are respectively connected to a signal generator and an amplifier as shown in FIG. 1.

Figure 7:
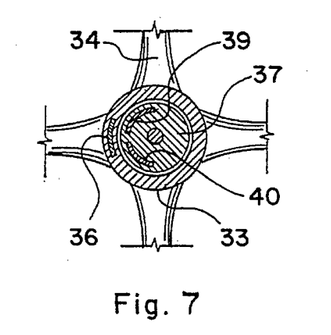
FIG. 7 illustrates a cross section of the turbine or propeller flowmeter shown in FIG. 6.

In FIG. 7 there is illustrated a cross section of the turbine or propeller flowmeter shown in FIG. 6, which cross section taken along plane 7—7 as shown in FIG. 6 illustrates with a greater clarity the disposition of the electrically conductive thin member or patch 36 included in the hollow cylindrical section 35 of the hub 33 of the turbine or propeller 34, and the pair of stationary electrically conductive members or patches 39 and 40 included in the cylindrical extension 38 of the stationary supporting member 37.

Figure 8:
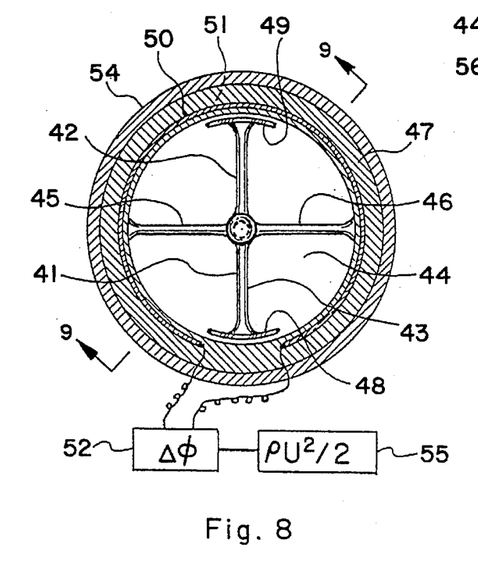
FIG. 8 illustrates a cross section of an embodiment of the pivotable but vane flowmeter employing an embodiment of the capacitive rotary position sensor of the present invention.
Figure 10:
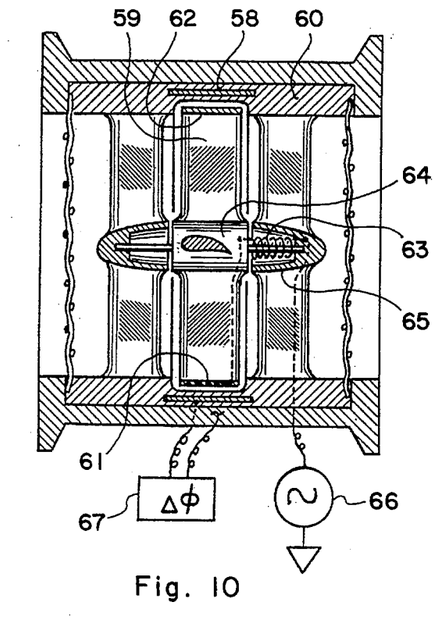
FIG. 10 illustrates a cross section of another embodiment of the pivotable vane flowmeter employing another embodiment of the capacitive rotary position sensor of the present invention.
Figure 11:
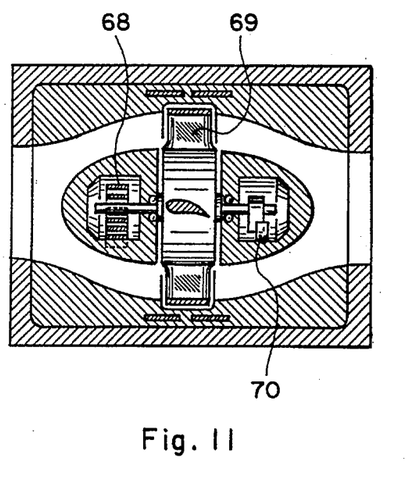
FIG. 11 illustrates a cross section of a further embodiment of the pivotable vane flowmeter employing the capacitive rotary position sensor.

In FIG. 8 there is illustrated a cross section of an embodiment of the pivotable but nonrotating vane flowmeter, that employs an embodiment of the capacitive rotary position sensor of the present invention. The pivotable vane 41 including a pair of blades 42 and 43 is disposed within a flow passage 44 having a circular cross section pivotally about an axis of pivot substantially coinciding with the center line of the flow passage 44, wherein a streamlined stationary supporting member supported by a pair of planar members 45 and 46 respectively extending from two diametrically opposite portions of the dielectric wall 47, supports the turbine or propeller 41 pivotally about the center line of the flow passage 44. An electrically conductive stub member or plate 48 is disposed on a circular cylindrical surface coaxial to the center line of the flow passage 44 and fixedly secured to the tip of the blade 43 of the pivotable vane 41, while a dielectric stub member or plate 49 is fixedly secured to the tip of the blade 42 in an arrangement providing an axisymmetric structural construction for the pivotable vane assembly. The dielectric wall 47 of the flow passage 44 includes a pair of electrically conductive elongated members 50 and 51 (the element 51 hidden behind the element 50 in this particular view is not visible) of the geometry of a ribbon or a flat bar are disposed in a side-by-side parallel relationship circumferentially on a circular cylindrical surface coaxial and closely adjacent to the circular cylindrical surface defined by the electrically conductive stub member or plate 48 affixed to the tip of the blade 43, wherein the sizable surface area of the electrically conductive stub member or plate 48 maintains a close surface-to-surface proximity relationship with a portion of the sizable surface areas of the pair of electrically conducting elongated members 50 and 51 at all instants during pivoting movement of the pivotable vane 41 about the center line of the flow passage 44. At least one of the pair of electrically conducting elongated members 50 and 51 has a high ohmic resistance per unit length thereof. The two opposite extremities of the first of the pair of elongated members 50 and 51 are respectively connected to two terminals of a phase angle difference measuring device 52 that measures a phase angle difference between two alternating electrical signals respectively taken off from the two opposite extremities of the first electrically conductive elongated member 50. One or both of the two opposite extremities of the second electrically conductive elongated member 51 is connected to an alternating electrical signal generator 53 that supplies an alternating electrical signal to the second electrically conductive elongated member 51. The dielectric wall 47 of the flow passage 44 is encased by a metallic cylindrical shell 54. The dielectric wall 47 must have a sizable thickness, whereby a sufficient dielectric spacing between the pair of electrically conductive elongated members 50 and 51, and the metallic cylindrical shell 54 is provided. The pivotable vane 41 is provided with a bias torque by the weight of the electrically conductive stub member or plate 48 made of a metal, or by a bias torque spring as shown in FIG. 10 or 11, wherein the bias torque acting in a direction opposite to the direction of the fluid dynamic torque received by the pivotable vane 41 from the flowing fluid media establishes an equilibrium rotary position for the pivotable vane 41. Generally, the bias torque $T_B$ provided by the bias torque spring such as the element 63 shown in FIG. 10 or the element 68 shown in FIG. 11, increases linearly with the angle of rotation θ of the pivotable vane 41 measured from a zero 14 angular position corresponding to zero velocity of the fluid media, $$T_B = C_S \quad (7)$$

where $C_S$ is the spring constant of the bias torque spring. The pivotable vane 41 stays at an equilibrium angular position, whereat the fluid dynamic torque given by equation (1) and the bias torque given by equation (7) are in balance, which equilibrium condition provides the following equation:

$$\frac{1}{2} \rho U^2 = H\theta, \quad (8)$$

where H is a constant of proportionality to be determined empirically by calibrating the flowmeter, which constant of proportionality is defined by equation $$H = C_S/C_L \quad (9)$$

When the fluid media density is known, the media velocity U or the volume flow rate of the media is determined as a function of the angle of rotation θ by using equation (8) or an empirical counterpart thereof. When the media velocity U is known as the result of measurement made by a volume flowmeter such as a turbine or propeller flowmeter, vortex flowmeter, differential pressure flowmeter, or other types of volume flowmeter, the mass flow rate of media as well as the density of the media is determined by using equation (8) or an empirical counterpart thereof. Experiment has shown that the rotary position θ of the turbine or propeller 41 varies proportionally to the phase angle difference Δφ. As a consequence, the angular position θ of the pivotable vane 41 can be determined as a function of the phase angle difference Δφ and then the dynamic pressure of the fluid media can be determined as a function of the angular position θ determined from the measured phase angle difference. In other words, the dynamic pressure, or the fluid velocity, or the fluid density can be determined as a function of the phase angle difference Δφ measured by the phase angle difference measuring device 52, wherein the required algorithm is carried out by a data processor 55.

Figure 9:
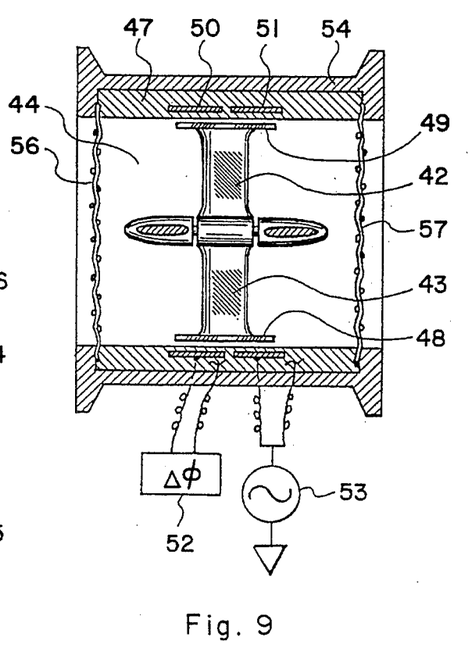
FIG. 9 illustrates another cross section of the pivotable vane flowmeter shown in FIG. 8.

In FIG. 9 there is illustrated another cross section of the pivotable vane flowmeter shown in FIG. 8, which cross section taken along plane 9—9 as shown in FIG. 8 illustrates with a greater clarity the disposition of the pair of stationary electrically conducting elongated members 50 and 51 included in and supported by the stationary dielectric wall 47 of the flow passage 44, and the electrically conductive stub member or plate 48 pivoting with the pivotable vane 41. The phase angle difference measuring device 52 measures the phase angle difference between two alternating electrical signals respectively taken off from the two opposite extremities of the first electrically conductive elongated member 50, while the alternating electrical signal generator 53 supplies an alternating electrical signal to one or both of the two opposite extremities of the second electrically conductive elongated member 51. The assembly of the pair of electrically conductive elongated members 50 and 51, and the electrically conductive stub member 48 must be electromagnetically shielded from the ambient surroundings. The combination of the metallic cylindrical shell 54 encasing the dielectric wall 47 and a pair of wire meshes 56 and 57 respectively covering the inlet and outlet openings of the flow passage 44 provides the electromagnetic shielding. The wire meshes 56 and 57 can be omitted, when the length of the flowmeter body encased by the metallic cylindrical shell 54 is extended to a sizable distance from the cross section of the flow passage 44 including the pivotable vane 41 in both directions. It should be understood that all lead wires extending out of the metallic cylindrical shell 54 must be electromagnetically shielded.

In FIG. 10 there is illustrated a cross section of another embodiment of the pivotable vane flowmeter employing another embodiment of the capacitive rotary position sensor of the present invention, that comprises a single stationary electrically elongated member 58 having a high specific ohmic resistance and a sizable surface area disposed circumferentially on a circular cylindrical surface coaxial to the axis of pivot of the turbine or propeller 59, and supported by and included in the dielectric wall 60 of the flow passage 60. An electrically conductive stub member or plate 62 having a sizable surface area is disposed on a circular cylindrical surface coaxial and closely adjacent to the circular cylindrical surface defined by the single electrically conductive elongated member 58, and is included in the shroud 63 of the turbine or propeller 59, which shroud 63 has a circular cylindrical shell structure coaxial to the axis of pivot of the pivotable vane 59. The bias torque countering the fluid dynamic torque exerted on the pivotable vane 59 by the flowing media is provided by a coil spring 63 with two opposite extremities respectively secured to the hub 64 of the pivotable vane 59 and the streamlined central core 65 rotatably supporting the pivotable vane 59. The bias torsion spring 63 is covered with an electrically insulating material and makes up a portion of the conductive electric circuit that transmits an alternating electrical signal from a signal generator 66 to the electrically conductive stub member or plate 62. A phase angle difference measuring device 67 measures a phase angle difference between two alternating electrical signals respectively taken off from the two opposite extremities of the single electrically conductive elongated member 58. The dynamic pressure, velocity, or density of the media moving through the flow passage 61 is determined as a function of the measured phase angle difference. In an alternative mode of operation, the alternating electrical signal generated by the signal generator 66 may be supplied to any one of the three elements comprising the electrically conductive stub member or plate 62 and the two opposite extremities of the single electrically conductive elongated member 58, and a phase angle difference between two alternating electrical signals respectively taken off from any two of the three elements comprising the electrically conductive stub member or plate 58 and the two opposite extremities of the single electrically conductive elongated member 58 may be measured, from which phase angle difference the dynamic pressure, velocity, or density of the media is determined. In an alternative design, the alternating electrical signal generated by the signal generator 66 may be supplied to the electrically conductive stub member or plate 62 through an electric circuit that comprises a capacitor in place of the bias torque spring 63, which capacitor comprises two capacitor plates respectively included in one end face of the hub 64 of the turbine or propeller 59 and one end face of the central core 65 rotatably supporting the pivotable vane 59, wherein the two capacitor plates are disposed in a close surface-to-surface proximity relationship therebetween.

In FIG. 11 there is illustrated a cross section of a further embodiment of the pivotable vane flowmeter, that is a modified version of the embodiment shown in FIG. 9, wherein the modification includes the changes parallel to those changes converting the embodiment shown in FIG. 1 to the embodiment shown in FIG. 4. In this particular illustrative embodiment, a spiral spring 68 provides the bias torque countering the fluid dynamic torque received by the pivotable vane 69 from the flowing media, and a stop 70 prevents the pivotable vane 69 from rotating beyond the zero angular position corresponding to zero velocity of the media. It is immediately clear that the particular embodiment of the pivotable vane flowmeter may employ the capacitive rotary position sensor comprising a single electrically conductive elongated member included in the embodiment shown in FIG. 10 in place of the capacitive rotary position sensor comprising the pair of electrically conductive elongated members shown in the particular illustrative embodiment. It should be understood that the pivotable vane flowmeters work best, when the individual blade or blades included in the pivotable vane has a cross section of an airfoil geometry having a constant angle of attack or pitch over the entire length of the individual blade. It should be also mentioned that the rotating turbine or propeller flowmeter as well as the pivotable vane flowmeters work best, when all of the electrically functioning elements included in the flowmeter are covered, lined or sheathed with a layer of electrically insulating material, whereby those elements are electrically insulated from the fluid media and other ambient surroundings.

Figure 12:
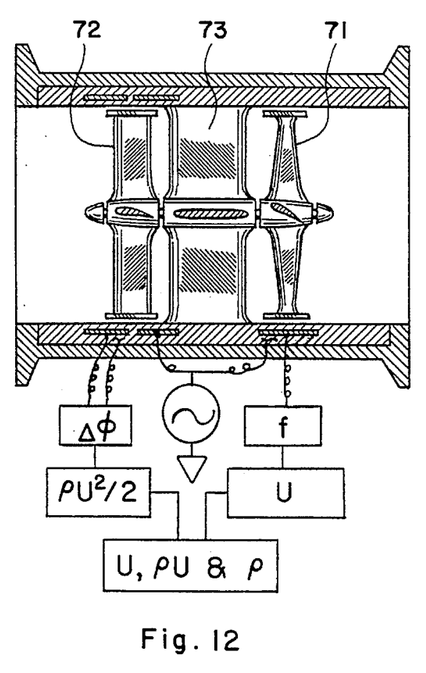
FIG. 12 illustrates a cross section of an embodiment of the multi-function or compound flowmeter comprising a series combination of the rotating turbine or propeller flowmeter and the pivotable vane flowmeter.

In FIG. 12 there is illustrated a cross section of an embodiment of the multi-function or compound flowmeter, that comprises a series combination of a rotating turbine or propeller flowmeter 71 and a pivotable vane flowmeter 72, which two flowmeters are separated from one another by a flow straightener 73 including a plurality of radially extending planar flow guides. It is generally preferable to install the pivotable vane flowmeter 72 upstream of the flow straightener 73 and install the rotating turbine or propeller flowmeter 71 downstream of the flow straightener 73. The velocity U or the volume flow rate of the fluid media is determined as a function of the frequency f of the output alternating electrical signal provided by the rotating turbine or propeller flowmeter 71, and the dynamic pressure $\rho U^2/2$ of the fluid media is determined as a function of the phase angle difference $\Delta\phi$ provided by the pivotable vane flowmeter 72. As the mass flow rate of the fluid media is equal to two times of the ratio of the dynamic pressure to the velocity of the fluid media, and the density of the fluid media is equal to the ratio of the mass flow rate to the volume flow rate of the fluid media, the mass flow rate $\rho U$ and the density $\rho$ of the fluid media are determined as functions of the frequency f provided by the rotating turbine or propeller flowmeter and the phase angle difference $\Delta\phi$ provided by the pivotable vane flowmeter. The particular illustrative embodiment provides a highly economic three-in-one flowmeter that determines the mass and volume flow rates of a fluid media having a variable or unknown density as well as the density of the fluid media.

Figure 13:
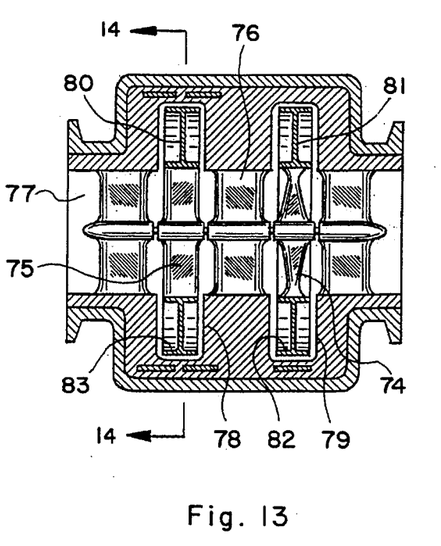
FIG. 13 illustrates a cross section of another embodiment of the multi-function or compound flowmeter.

In FIG. 13 there is illustrated a cross section of another embodiment of the multi-function or compound flowmeter comprising a series combination of a rotating turbine or propeller flowmeter 74 and a pivotable vane flowmeter 75 separated from one another by a flow straightener 76, which embodiment is particularly suited for the construction of the three-in-one flowmeters of small port sizes. The flow passage 77 includes two radially enlarged sections 78 and 79 respectively accommodating the pivotable vane 75 with a radially extended shroud 80, and the rotating turbine or propeller 74 with a radially extended shroud 81. The electrically conductive thin member included in the capacitive rotary speed sensor of the rotating turbine or propeller flowmeter 74 is included in the outer circular cylindrical shell 82 of the shroud 81 of the rotating turbine or propeller 74, while the electrically conductive stub member included in the rotary position sensor of the pivotable vane flowmeter 75 is included in the outer circular cylindrical shell 83 of the shroud 80 of the nonrotating turbine or propeller 75.

Figure 14:
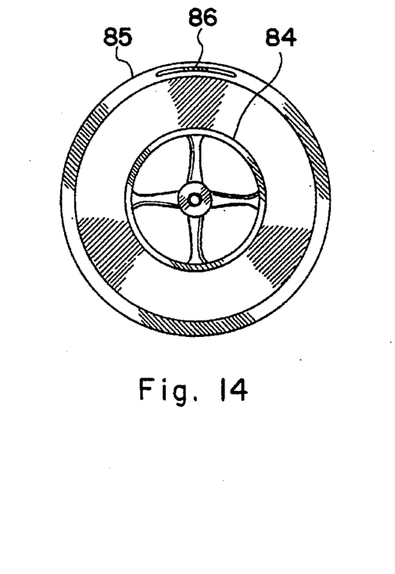
FIG. 14 illustrates an end view of the rotating turbine or propeller, or the pivotable vane included in the multi-function or compound flowmeter shown in FIG. 13.

In FIG. 14 there is illustrated an end view of a blade assembly employed in the construction of the "rotating turbine or propeller flowmeter or the pivotable vane flowmeter", included in the multi-function or compound flowmeter shown in FIG. 13. The assembly of the hub and blades are fitted within the inner circular cylindrical shell 84 of the shroud assembly and the extremities of the individual blades are fixedly secured to the inner circular cylindrical shell 84. The annular planar member 87 structurally joins the inner and outer circular cylindrical shells 84 and 85 to one another. The outer circular cylindrical shell 85 includes the electrically conductive thin member or stub member 86. The diameter of the inner circular cylindrical shell 84 is matched to the diameter of the unaltered portion of the flow passage, while the diameter of the outer circular cylindrical shell 85 is matched to the diameter of the radially enlarged section of the flow passage.

Figure 15:
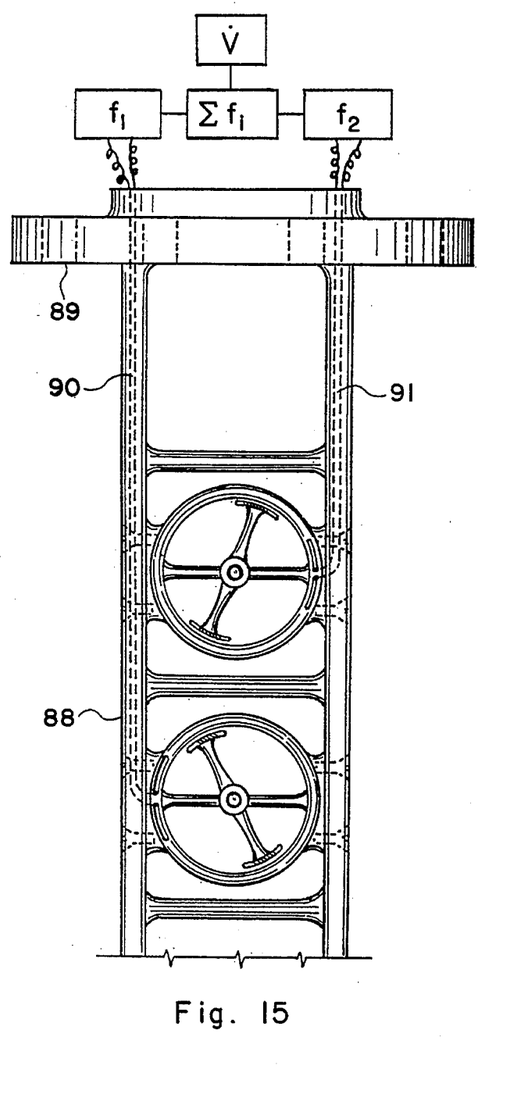
FIG. 15 illustrates an embodiment of the insertion type flowmeter comprising one or more rotating turbines or propellers, or one or more pivotable vane, or one or more combinations of the rotating turbine or propeller and the pivotable vane.

In FIG. 15 there is illustrated an embodiment of the insertion type flowmeter comprising one or more of the rotating turbines or propellers, or one or more of the pivotable vane, or one or more of the series combinations of a rotating turbine or propeller flowmeter and a pivotable vane flowmeter. One or more of the individual flowmeters are supported by an elongated structural member 88 extending from an anchoring flange 89. The elongated structural member 88 including one or more of the individual flowmeters extend through a hole disposed through the wall of a conduit or pipe and into the flow passage inside of the conduit or pipe, while the anchoring flange 89 is secured to a matching flange affixed to the wall of the conduit or pipe. The lead wires 90 and 91 extending from the individual flowmeters rigidly mounted on the elongated structural member 88 are routed through holes or grooves included in the elongated structural member 88 and out of the outside face of the anchoring flange 89. The flow rate of the fluid media moving through the flow passage inside of the conduit or pipe is determined from a sum or averaged value of the data provided by the individual flowmeters. For example, the volume flow rate V of the fluid media is determined from the sum or averaged value of the frequencies $f_1$, $f_2$, etc. respectively provided by the individual rotating turbine or propeller flowmeters. The advantage provided by the packaging of the capacitive rotary speed and position sensor of the present invention into a thin streamlined structural assembly is immediately appreciated, when the particular construction of the insertion type flowmeter shown in FIG. 15 is examined, for the conventional rotating turbine or propeller flowmeter employing the magnetic induction or magnetic reluctance rotary speed sensor cannot be assembled into a highly streamlined structure exemplified by the insertion type flowmeter shown in FIG. 15.

While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring flow rate of media comprising in combination:
    a) a pivotable member receiving a fluid dynamic torque from a flow of media disposed in a flow stream of the media pivotally about a pivot axis;
    b) means for providing a bias torque counter-acting the fluid dynamic torque received by the pivotable member; and
    c) means for measuring pivotal position of the pivotable member about the pivot axis as a measure of dynamic pressure of the flow of media, said means for measuring pivotal position including;
        i) an electrically conductive stub member with a surface area;
        ii) an electrically conductive elongated member with a surface area having a finite value of ohmic resistance per unit length thereof disposed closely adjacent to the electrically conductive stub member in a relationship allowing relative movement between the electrically conductive stub member and the electrically conductive elongated member in directions following a length of the electrically conductive elongated member, said relative movement being kinematically coupled to the pivoting movement of the pivotable member about the pivot axis; wherein the surface area of the electrically conductive stub member maintains a closely adjacent surface-to-surface relationship with a portion of the surface area of the electrically conductive elongated member during the pivoting movement of the pivotable member about the pivot axis;
        iii) means for supplying an alternating electrical signal to the electrically conductive stub member; and
        iv) means for obtaining an electrical variable representing a phase angle difference between two alternating electrical signals respectively taken off from two opposite extremities of the electrically conductive elongated member as a measure of dynamic pressure of the flow of media.

2. An apparatus as defined in claim 1 wherein said means for supplying the alternating electrical signal to the electrically conductive stub member comprises an electrically conducting means transmitting the alternating electrical signal to the electrically conductive stub member by an electrical conduction.

3. An apparatus as defined in claim 2 wherein the combination of the electrically conductive stub member and the electrically conductive elongated member is surrounded by an enclosure providing an electromagnetic shielding from ambient surroundings.

4. An apparatus as defined in claim 2 wherein said combination includes means for determining flow rate of media as a function of the electrical variable representing the phase angle difference.

5. An apparatus as defined in claim 2 wherein said combination includes a rotary member receiving a fluid dynamic torque from the flow of media disposed in the flow stream of the media rotatably about a rotation axis means for measuring rate of rotation of the rotary member as a measure of volume flow rate of media, and means for determining mass flow rate of media as a function of the rate of rotation of the rotary member and the electrical variable representing the phase angle difference.

6. An apparatus as defined in claim 1 wherein said combination includes another electrically conductive elongated member with a surface area and a finite value of ohmic resistance per unit length thereof disposed in a parallel relationship to said an electrically conductive elongated member defined in claim 1 and closely adjacent to the electrically conductive stub member, wherein the surface area of the electrically conductive stub member also maintains a closely adjacent surface-to-surface relationship with a-portion of the surface area of said another electrically conductive elongated member during the pivoting movement of the pivotable member about the pivot axis, and said means for supplying the alternating electrical signal to the electrically conductive stub member comprises said another electrically conductive elongated member and an electrically conducting means transmitting the alternating electrical signal to at least one of the two opposite extremities of said another electrically conductive elongated member; wherein the alternating electrical signal is transmitted from said another electrically conductive elongated member to the electrically conductive stub member by capacitive electrical interaction between the surface area of the electrically conductive stub member and the portion of the surface area of said another electrically conductive elongated member under the closely adjacent surface-to-surface relationship therebetween.

7. An apparatus as defined in claim 6 wherein the combination of the electrically conductive stub member, said an electrically conductive elongated member defined in claim 1 and said another electrically conductive elongated member is surrounded by an enclosure providing an electromagnetic shielding from ambient surroundings.

8. An apparatus as defined in claim 6 wherein said combination includes means for determining flow rate of media as a function of the electrical variable representing the phase angle difference.

9. An apparatus as defined in claim 6 wherein said combination includes a rotary member receiving a fluid dynamic torque from the flow of media disposed in the flow stream of the media rotatably about a rotation axis, means for measuring rate of rotation of the rotary member as a measure of volume flow rate of media, and means for determining mass flow rate of media as a function of the rate of rotation of the rotary member and the electrical variable representing the phase angle difference.

10. An apparatus for measuring flow rate of media comprising in combination:

a) a pivotable member receiving a fluid dynamic torque from a flow of media disposed in a flow stream of the media pivotally about a pivot axis;

b) means for providing a bias torque counter-acting the fluid dynamic torque received by the pivotable member; and c) means for measuring pivotal position of the pivotable member about the pivot axis as a measure of dynamic pressure of the flow of media, said means for measuring pivotal position including;
   i) an electrically conductive stub member with a surface area;
   ii) an electrically conductive elongated member with a surface area having a finite value of ohmic resistance per unit length thereof disposed closely adjacent to the electrically conductive stub member in a relationship allowing relative movement between the electrically conductive stub member and the electrically conductive elongated member in directions following a length of the electrically conductive elongated member, said relative movement being kinematically coupled to the pivoting movement of the pivotable member about the pivot axis; wherein the surface area of the electrically conductive stub member maintains a closely adjacent surface-to-surface relationship with a portion of the surface area of the electrically conductive elongated member during the pivoting movement of the pivotable member about the pivot axis;
   iii) means for supplying an alternating electrical signal to one of the following three elements: the electrically conductive stub member and two opposite extremities of the electrically conductive elongated member; and
   iv) means for obtaining an electrical variable representing a phase angle difference between two alternating electrical signals respectively taken off from two of the following three elements: the electrically conductive stub member and the two opposite extremities of the electrically conductive elongated member, as a measure of dynamic pressure of the flow of media.

11. An apparatus as defined in claim 10 wherein the combination of the electrically conductive stub member and the electrically conductive elongated member is surrounded by an enclosure providing an electromagnetic shielding from ambient surroundings.

12. An apparatus as defined in claim 10 wherein said combination includes means for determining flow rate of media as a function of the electrical variable representing the phase angle difference.

13. An apparatus as defined in claim 10 wherein said combination includes a rotary member receiving a fluid dynamic torque from the flow of media disposed in the flow stream of the media rotatably about a rotation axis, means for measuring rate of rotation of the rotary member as a measure of volume flow rate of media, and means for determining mass flow rate of media as a function of the rate of rotation of the rotary member and the electrical variable representing the phase angle difference.

14. An apparatus for measuring flow rate of media comprising in combination:

a) a pivotable member receiving a fluid dynamic torque from a flow of media disposed in a flow stream of the media pivotally about a pivot axis;

b) means for providing a bias torque counter-acting the fluid dynamic torque received by the pivotable member; and c) means for measuring pivotal position of the pivotable member about the pivot axis as a measure of dynamic pressure of the flow of media, said means for measuring pivotal position including;
   i) an electrically conductive stub member with a surface area;
   ii) a pair of electrically conductive elongated members disposed in a parallel relationship to one another, each of said pair of electrically conductive elongated members having a surface area and a finite ohmic resistance per unit length thereof and disposed closely adjacent to the electrically conductive stub member in a relationship allowing relative movement between the electrically conductive stub member and the combination of the pair of electrically conductive elongated members in directions following a length of the combination of the pair of electrically conductive elongated members, said relative/movement being kinematically coupled to the pivoting movement of the pivotable member about the pivot axis; wherein the surface area of the electrically conductive stub member maintains a closely adjacent surface-to-surface relationship with a portion of the surface area of each of the pair of electrically conductive elongated members during the pivoting movement of the pivotable member about the pivot axis;
   iii) means for supplying an alternating electrical signal to at least one of two opposite extremities of a first of the pair of electrically conductive elongated members; and
   iv) means for obtaining an electrical variable representing a phase angle difference between two alternating electrical signals respectively taken off from two of the following three elements; the other of the two opposite extremities of the first of the pair of electrically conductive elongated members opposite to said one extremity, and two opposite extremities of second of the pair of electrically conductive elongated members, as a measure of dynamic pressure of the flow of media.

15. An apparatus as defined in claim 14 wherein the combination of the electrically conductive stub member and the pair of electrically conductive elongated members is surrounded by an enclosure providing an electromagnetic shielding from ambient surroundings.

16. An apparatus as defined in claim 14 wherein said combination includes means for determining flow rate of media as a function of the electrical variable representing the phase angle difference.

17. An apparatus as defined in claim 14 wherein said combination includes a rotary member receiving a fluid dynamic torque from the flow of media disposed in the flow stream of media rotatably about a rotation axis, means for measuring rate of rotation of the rotary member as a measure of volume flow rate of media, and means for determining mass flow rate of media as a function of the rate of rotation of the rotary member and the electrical variable representing the phase angle difference.

* * * * *